Jan. 22, 1935.  V. G. APPLE  1,988,708
ELECTRICAL AND MECHANICAL BRAKE APPLYING MECHANISM
Filed July 26, 1928  3 Sheets-Sheet 3
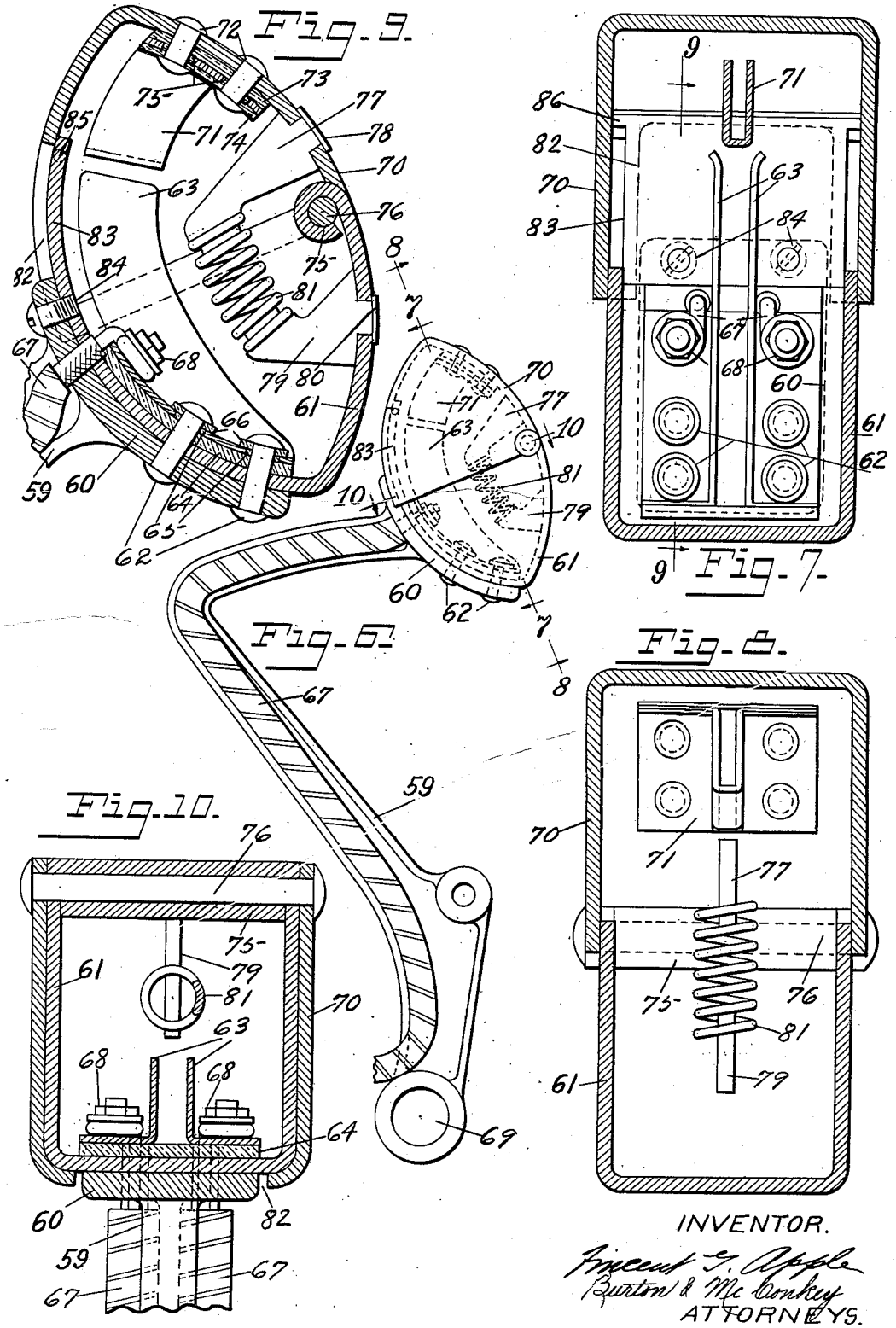
INVENTOR.
Vincent G. Apple
Burton & McConkey
ATTORNEYS.

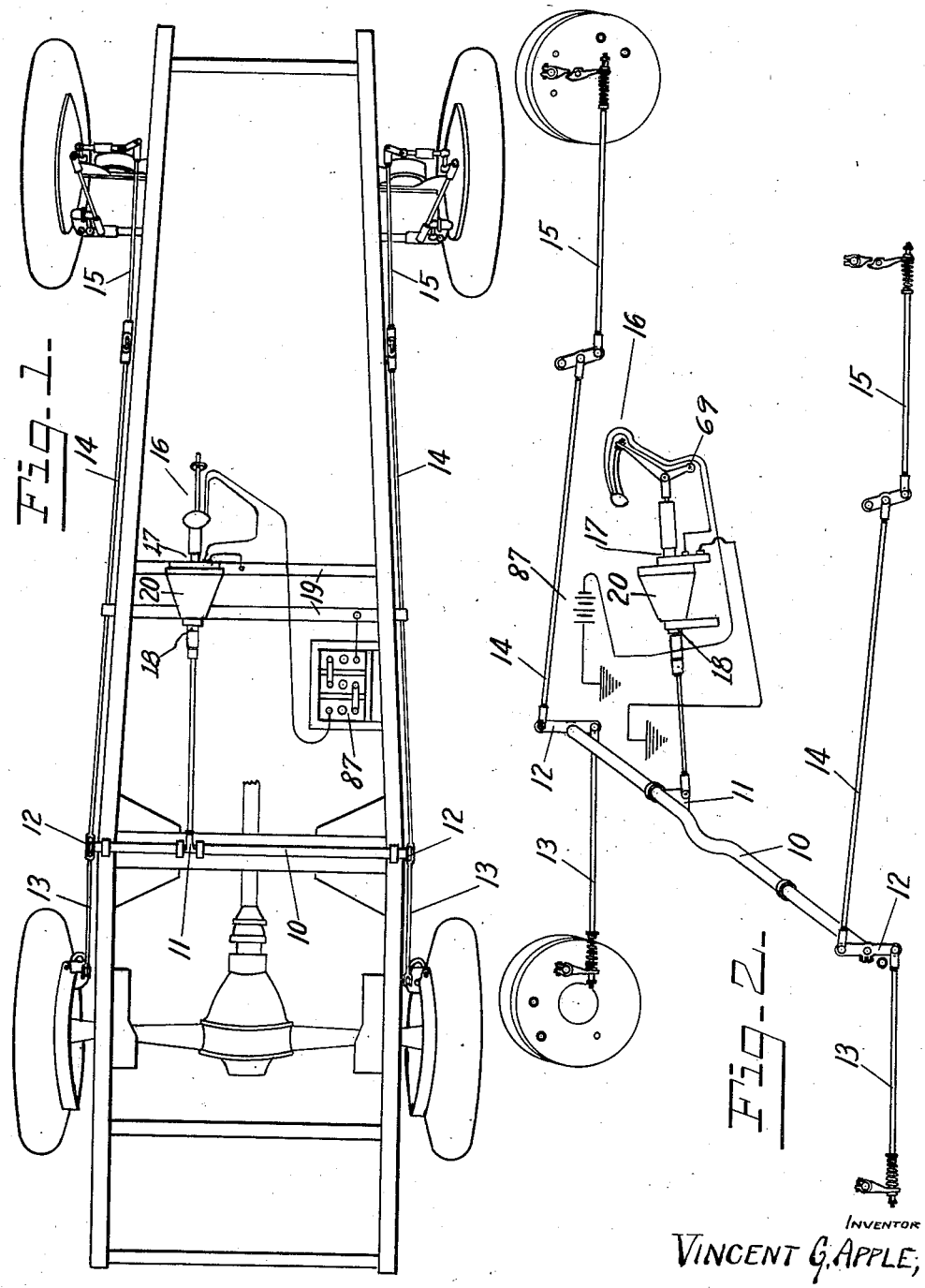

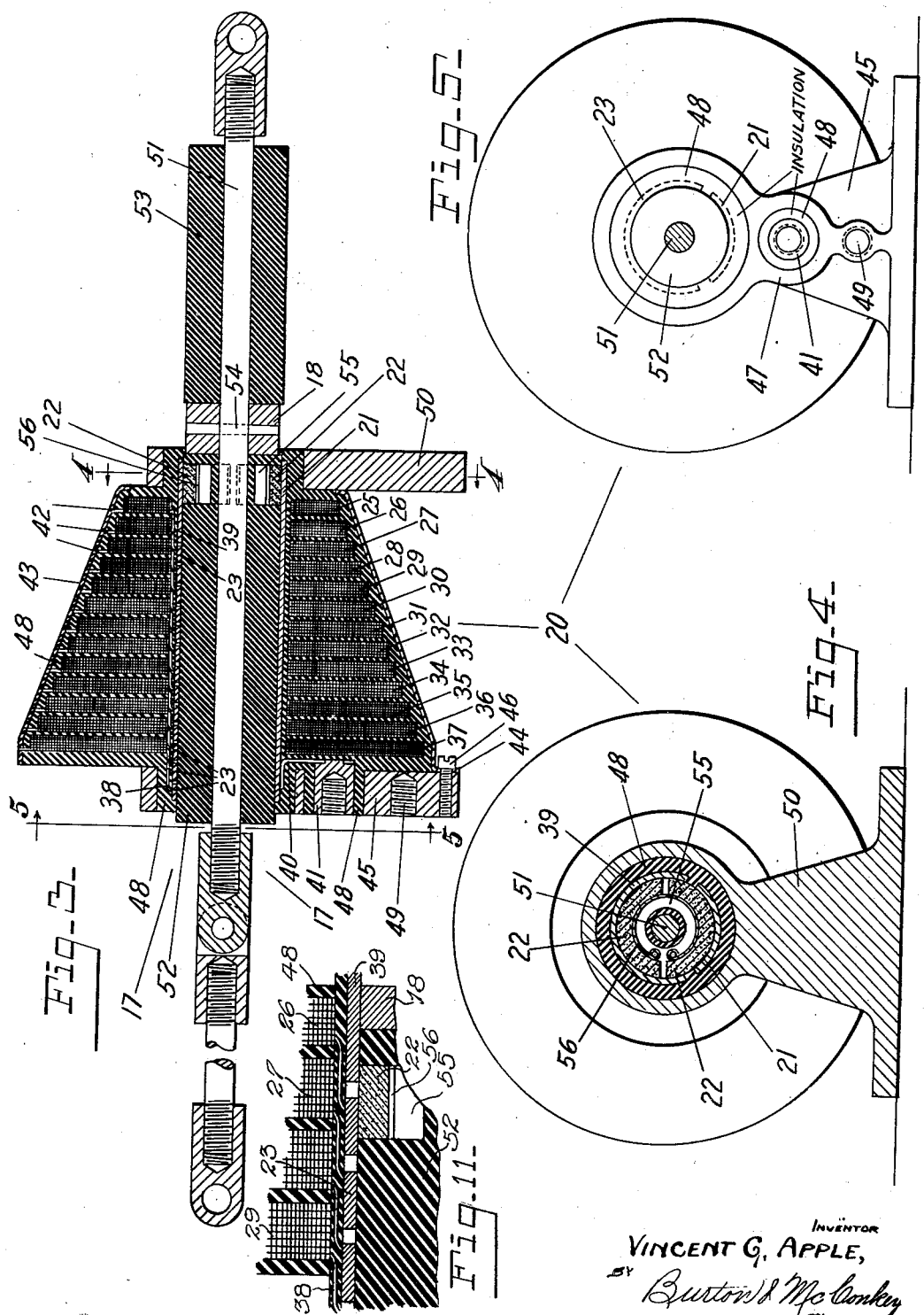

Patented Jan. 22, 1935

1,988,708

UNITED STATES PATENT OFFICE 1,988,708

ELECTRICAL AND MECHANICAL BRAKE APPLYING MECHANISM

Vincent G. Apple, Dayton, Ohio, assignor to Bendix Brake Company, South Bend, Ind., a corporation of Illinois Application July 26, 1928, Serial No. 295,578

9 Claims. (Cl. 188—156)

My invention relates to improvements in combined mechanically and electrically operated brakes and particularly to such brakes when used on a motor vehicle.

One object of my invention is to provide electric brake operating mechanism wherein an electric power device responds with increasing strength to apply the brakes in proportion to the brake applying movement of the mechanism; and wherein such power device is progressively energized to increase its brake applying effort in advance of the movement of its brake actuating element; and wherein, in combination with the mechanical application of the brakes a tension element is employed, the movement of which determines the brake applying effort of the power device and controls its energization.

Another important object resides in the provision, in brake applying mechanism of this character, of a switch controlling the electric circuit wherein the power device is located, which switch is carried by the manual operable brake applying member, such as the pedal, and is responsive to a determined pedal pressure of a particular kind.

In the employment of my invention the brakes may be applied manually and, if desired, the electric power devices may be thrown into the circuit through the closing of a normally open switch carried by the manually operable brake applying member, either to supplement the mechanical brake applying effort transmitted through the manual actuation of said member or to apply the brakes to a determined degree following which the switch may be released and the brakes held applied at the attained degree of brake application through maintaining a manually applied force thereon.

An important feature consists in providing, in combination with a manually operable brake applying member such as a pedal, a control switch operatively responsive to the tilting movement of a rockably supported switch element on the pedal; and in providing an electric power device, which may be of the solenoid type, comprising axially arranged and spaced apart coils surrounding one of the mechanical tension elements of the brake applying linkage and a core carried by said tension element to be drawn into said coils to be acted upon thereby with increasing force to exert in turn brake applying effort upon the tension element.

Various other objects, advantages and important features of my invention will more fully appear from the following description of the illustrative embodiment described in the specification, defined in the claims and shown in the accompanying drawings, wherein—

Fig. 1 is a top view of an automobile chassis having brake applying mechanism embodying my invention.

Fig. 2 shows the brake mechanism in perspective.

Fig. 3 is a longitudinal-vertical cross-section through the solenoid which I employ to assist the manual braking means.

Fig. 4 is a cross-section taken on the line 4—4 of Fig. 3.

Fig. 5 is a cross-section taken on the line 5—5 of Fig. 3.

Fig. 6 is a side elevation of the combined pedal and switch which applies the brakes manually and controls the solenoid at the same time.

Fig. 7 is a cross-section through Fig. 6 at 7—7.

Fig. 8 is a cross-section through Fig. 6 at 8—8.

Fig. 9 is a cross-section through Fig. 7 at 9—9.

Fig. 10 is a cross section through Fig. 6 at 10—10.

Fig. 11 is a detail view of the commutator sections and the brush and the manner of contacting one another.

In the drawings, shaft 10, arm 11, levers 12, rods 13, 14 and 15, etc., comprise mechanical linkage such as is used in a conventional manually operable braking system. But the brake pedal 16 and the linkage between it and arm 11 are of special construction and particularly adapted to this invention.

In an ordinary manually operable brake system the brake pedal is connected to arm 11 by a plain rod similar to a rod 14, but in the adaptation herein shown this plain rod is replaced by a rod or core 17 composed of a number of different parts, each of which has its individual office as will be hereinafter described. This rod or core, however, functions also as an ordinary plain rod in that it acts as a tension member in the linkage through which the manual effort is transmitted to the brakes.

Mounted on frame cross-members 19 is the solenoid 20 through which core 17 passes and into which the armature portion 18 is adapted to be drawn to assist the movement caused by the application of manual effort to pedal 16.

The solenoid 20 with the core 17 in place is shown to an enlarged scale in Figs. 3, 4 and 5, and is constructed as follows:

A relatively long plate 21, Fig. 3, of conductive material is bent to compose a segment of a circle (see Figs. 4 and 5), and a plurality of narrow strips 23, Fig. 3, of similar material are bent to a longer segment of the same circle as in Fig. 5. The narrow strips 23 are the commutator sections. These strips are identical in construction and are arranged in spaced apart parallel relationship as shown in Fig. 3.

Coils 25 to 37 inclusive are placed around these several segments. The diameters of the successive coils progressively increase to provide increased ampere turns in successive coils as shown.

The inner end of each coil 25 to 37 inclusive is connected as at 38 to its segment 23. A relatively wide strip 39 is arranged at one end alongside the narrow strips but is not connected to any coil. It is upon this strip, as a dead strip, that the brushes 22 of the core rest when the device is inactive.

Curved plate 21 is joined by a connection 40 to a binding post 41. The outer ends of coils 25 to 37 inclusive are then connected as at 42 to the sheet metal housing 43 which surrounds the coils.

An ear 44 is formed by bending out a portion of housing 43. Bracket 45 is then put in place and fastened to the housing by screw 46 extending through said ear. Bracket 45 electrically connects to housing 43 alone, being spaced from the binding post 41 leaving a clearance into which insulation may extend.

The structure is next placed in a mold and insulating material 48 is molded through and about the coils and segments, between binding post 41 and bracket 45, forming a solid rigid structure having adequate electrical and mechanical protection.

A hole 49 tapped in bracket 45 provides a common connection to the outer ends of all of the coils. The addition of bracket 50 completes the solenoid structure 20.

The core 17 is constructed by placing on rod 51 a soft iron armature 18 and cylinders 52 and 53 of insulating material arranged adjacent to the armature and at opposite ends thereof. Armature 18 is shown secured to rod 51 by a pin 54 but it may be otherwise secured if desired. Cylinders 52 and 53 are preferably molded about knurled surfaces on rod 51. An annular groove 55 in cylinder 52 contains the brush gear.

The brush gear comprises the two semi-annular brushes 22 preferably of a material having lubricating properties and lubricating material may be incorporated in the compound from which cylinders 52 and 53 are molded. Annular spring 56 forces the two brushes 22 apart and against plate 21 on the one side and strips 23 or 39 on the other, whereby plate 21 is electrically connected to one or more of the strips.

The solenoid is illustrated in its inoperative position only, but it is readily apparent that, with a suitable current source connected to binding post 41 and to bracket 45 as at 49, if manual pressure on pedal 16 moves core 17 to draw brushes 22 from dead strip 39 on to the adjacent strip 23, the coil 25 will be energized and will draw armature 18 toward it, whereupon brushes 22 will be moved to the next strip 23, the cycle being thus repeated until armature 18 has been drawn into the last and strongest coil 37, and, once started, this would occur whether the operator so desired or not, if no means within his control were provided whereby the circuit could be broken at will. This solenoid is specifically described and claimed in my co-pending application, Serial No. 295,580, filed July 26, 1928, now Patent No. 1,807,956.

As a control means for the solenoid I combine a switch mechanism, through which the electric current may pass, with a brake pedal, in such a manner that the same manual movement that ordinarily applies the brakes will simultaneously complete the electrical connection to the solenoid winding.

Figs. 6 to 10 inclusive show the combined brake pedal and switch to an enlarged scale. The pedal stem 59 instead of having the usual relatively flat tread for the foot to engage has a curved pad 60 at its upper end to which the hollow casing containing the switch parts are secured.

A cup shaped shell 61 drawn from sheet metal is secured to pad 60 by rivets 62, and two angular contact blades 63 are secured to the interior of the cup by the same said rivets. A strip of sheet insulation 64 separates the contact blades from the shell, and insulation washers 65 and 66 separate the contact blades and the rivets.

Two armored wires 67 are attached, one to each blade 63, by nuts 68. These wires are brought down alongside pedal 16 to near its pivoted point 69 before leaving the pedal, in order that flexure of the wires from pedal movement may be reduced to a minimum.

The cover 70 of the switch casing is also drawn from sheet metal, and is similar to shell 61 except that it is sufficiently larger to telescope over the shell on three sides, but not on the fourth side where it is hinged.

A contact member 71 is bent from a single piece of sheet metal and riveted to the upper inside of cover 70 by rivets 72. Strips 73 and 74 and washers 75 of insulation separate the contact blade from the rivets and from the cover. This contact member 71 is intended to be inserted between contact blades 63 to close the circuit.

A hinge is provided by curling one edge of shell 61 as at 75 and passing a pin 76 through this curled portion and through holes in the sides of cover 70.

A stamping 77 is riveted at 78 to cover 70 and a similar stamping 79 is riveted at 80 to shell 61. These stampings support spring 81 which is normally under compression tending to raise cover 70 from shell 61 and thus keep contact member 71 from between contact blades 63 to keep the circuit open.

In order that cover 70 may be depressed and telescoped over shell 61, it is cut away at 82 sufficiently to clear pad 60 when the cover is in its extreme downward position.

A curved plate 83 of sufficient size to close the opening 82 is then secured to pad 60 by screws 84. Pins 85 in cover 70 engage ears 86 on curved plate 83 to limit the upward movement of cover 70 due to the expansion of spring 81. This control pedal is specifically described and claimed in my co-pending application, Serial No. 295,581, filed July 26, 1928.

Having considered the combined pedal and switch mechanism with reference to Figs. 6 to 10 inclusive, it will be plain that the operator may concentrate his manual brake applying effort on the lower or on the upper portion of the switch casing at will, by simply rocking his foot, so that he may apply the brakes by manual effort alone, or by power and manual effort at the same time.

Referring again to Figs. 1 and 2, a battery 87 has its terminals connected to the terminals of the solenoid with one line passing through the switch mechanism of pedal switch 16. The system is operable as follows:

The operator may concentrate his effort on the lower half 61 of the switch casing, and thus operate the brakes by manual means alone, or he may rock his foot "to forward" as he depresses the pedal and thereby join blades 63 with member 71 and make connection to the solenoid. But this connection does not cause the solenoid to be operative until the pedal is depressed sufficiently to move the solenoid brushes 22 on to the first strip 23 to energize the first coil 25.

When, however, brushes 22 once make contact with the first strip 23 the solenoid will operate the core 17 through its entire range, pulling pedal 16 after it, provided only, that the operator follows the upper half of the pedal with his foot keeping it depressed and the switch blades in contact.

If the solenoid acts ahead of the manual pressure the current is automatically broken by the pedal switch, or, when the brake is fully applied, the withdrawal of the manual pressure from the upper half of the switch casing immediately releases the pull of the solenoid and the brake may be returned to its normal position.

I claim:

1. Combined mechanical and electric brake mechanism comprising, in combination, brakes, a brake control member, linkage including a rod operatively connecting said member with the brakes, a series of axially arranged electric coils surrounding the rod and increasing successively in strength from one end of the series to the other, a core element of magnetizable material carried by the rod and adapted to be drawn into said coils through actuation of the rod by said member, and means automatically operable to progressively energize the coils in advance of said core element.

2. Combined mechanical and electric brake mechanism comprising, in combination, brakes, a brake applying member, linkage including a tension element operatively connecting said member with the brakes, a series of axially arranged spaced apart electric coils surrounding said tension element, said coils being of progressively increasing strength from one end of the series to the other, a magnetizable core element carried by said tension element to be drawn into said coils upon actuation of the tension element by the brake applying member, and means including a brush member carried by the tension element adapted to progressively engage said coils in advance of the magnetizable core element.

3. Combined mechanical and electric brake mechanism comprising, in combination, brakes, a brake applying member, linkage including a tension element operatively connecting said member with the brakes, a series of axially arranged spaced apart electric coils surrounding said tension element, said coils being of progressively increasing strength from one end of the series to the other, an electric circuit including said coils, a core operatively connected with the tension element to be drawn mechanically thereby into said coils and to be acted upon electrically to draw said tension element into the coils, and means operatively associated with the movement of the core to progressively energize the coils in advance of the core, and switch mechanism carried by said applying member operable to make and break the circuit through the coils.

4. Combined mechanical and electric brake mechanism comprising, in combination, brakes, a brake applying member, linkage including a tension element operatively connecting said member with the brakes, a series of axially arranged spaced apart electric coils surrounding said tension element, said coils being of progressively increasing strength from one end of the series to the other, an electric circuit including said coils, a core operatively connected with the tension element to be drawn mechanically thereby into said coils and to be acted upon electrically to draw said tension element into the coils, and means operatively associated with the movement of the core to progressively energize the coils in advance of the core, and normally open switch mechanism controlling the circuit carried by said applying member and responsive to a determined brake applying pressure to close said circuit.

5. A combined mechanical and electric braking system comprising, brakes, a brake pedal, linkage including a tension element operatively connecting the pedal with the brakes, a series of axially adjacent electric coils surrounding said tension element, said coils increasing progressively in strength form one end of the series to the other, a core of magnetizable material attached to the said element and adapted to be drawn into said coils upon movement of said element mechanically by said pedal to be there acted upon magnetically by said coils, and means to progressively energize the successive coils in advance of the said core and an electric switch operable by the same manual effort which operates the said pedal to make or break the circuit through the said coils.

6. In an automotive braking system, the combination of brakes, a brake pedal, linkage including a tension element operatively connecting the pedal with the brakes, an electric circuit including a plurality of axially adjacent electric coils of progressively increasing dimensions attached to the chassis and surrounding said tension element, a magnetizable core affixed to the said element axially beyond the coils and adapted to be initially drawn into said coils mechanically by said element to be acted on magnetically by said coils to be drawn further thereinto, means to progressively energize the coil next axially beyond the core ahead of the core, and an electric switch in said circuit combined with the said pedal whereby the same manual movement which mechanically applies the brakes may also complete the circuit through the coils but only upon a determined brake applying movement of the tension element.

7. In an automotive braking system, the combination of brakes, a brake pedal, brake applying rods connecting said pedal and said brakes, an electric circuit including a plurality of coaxial coils of progressively increasing strength surrounding one of said rods and held in fixed relation to the chassis and having a series of electric contacts at their interior diameter, one contact for each coil, a core of magnetic material affixed to said rod axially beyond the smallest coil and adapted to be drawn into said coil mechanically by said rod to be acted upon magnetically by said coil, a brush carried by said rod positioned to precede said core to engage said contacts to progressively energize the next larger coil, and an electric switch combined with said pedal to make or break the electric circuit at will.

8. Combined mechanical and electric brake mechanism comprising, in combination, brakes, a brake applying member, linkage including a tension element operatively connecting said member with the brakes, a series of axially arranged electric coils surrounding said tension element, said coils being of progressively increasing strength from one end of the series to the other, a core operatively connected with the tension element to be drawn mechanically thereby into said coils and to be acted upon electrically by said coils to cause said tension element to move through said coils, switch contacts for said coils arranged in a series, and means carried by said linkage operable upon brake applying movement thereof to successively engage said switch contacts to successively close the circuits to said coils whereby the latter are energized to electrically act on said core, said switch contacts being arranged with respect to said means so that upon energization of one coil the resulting movement of the linkage therefrom will cause the switch contact for the next succeeding coil to be engaged by said means thereby automatically causing said linkage to move through said coils until the maximum coil has acted on said core.

9. Combined mechanical and electric brake mechanism comprising, in combination, brakes, a brake applying member, linkage including a tension element operatively connecting said member with the brakes, a series of axially arranged electric coils surrounding said tension element, said coils being of progressively increasing strength from one end of the series to the other, a core operatively connected with the tension element to be drawn mechanically thereby into said coils and to be acted upon electrically by said coils to cause said tension element to move through said coils, switch contacts for said coils arranged in a series, means carried by said linkage operable upon brake applying movement thereof to successively engage said switch contacts to successively close the circuits to said coils whereby the latter are energized to electrically act on said core, said switch contacts being arranged with respect to said means so that upon energization of one coil the resulting movement of the linkage therefrom will cause the switch contact for the next succeeding coil to be engaged by said means thereby automatically causing said linkage to move through said coils until the maximum coil has acted on said core, and switch control mechanism associated with said brake applying member operable to control the energization and deenergization of the coils.

VINCENT G. APPLE.